United States Patent
Lee

(10) Patent No.: US 10,020,647 B2
(45) Date of Patent: Jul. 10, 2018

(54) ELECTRICAL DEVICE PROTECTION CIRCUIT FOR SMART GRID

(71) Applicant: EZEX CORPORATION, Seongnam-si (KR)

(72) Inventor: Kyung Sup Lee, Gwacheon-si (KR)

(73) Assignee: EZEX CORPORATION, Seongnam-si (KR)

( * ) Notice: Subject to any disclaimer, the term of this patent is extended or adjusted under 35 U.S.C. 154(b) by 344 days.

(21) Appl. No.: 15/064,966

(22) Filed: Mar. 9, 2016

(65) Prior Publication Data

US 2017/0093144 A1    Mar. 30, 2017

(30) Foreign Application Priority Data

Sep. 24, 2015    (KR) .................. 10-2015-0135648

(51) Int. Cl.
  *H02H 3/06*    (2006.01)
  *H02H 3/08*    (2006.01)
(52) U.S. Cl.
  CPC .............. *H02H 3/066* (2013.01); *H02H 3/08* (2013.01)
(58) Field of Classification Search
  CPC ........... H02H 3/087; H02H 3/066; H02H 3/08
  See application file for complete search history.

(56) References Cited

U.S. PATENT DOCUMENTS

| | | | | | |
|---|---|---|---|---|---|
| 4,360,851 A | * | 11/1982 | Zundel | .................. | H02H 3/087 361/101 |
| 4,752,698 A | * | 6/1988 | Furuyama | ............ | G08B 25/045 307/116 |
| 5,629,588 A | * | 5/1997 | Oda | .................... | H05B 41/2921 315/119 |
| 8,692,477 B1 | * | 4/2014 | Lee | .................... | H05B 33/0815 315/185 S |

FOREIGN PATENT DOCUMENTS

| KR | 20000009084 | 2/2000 |
|---|---|---|
| KR | 200421608 | 7/2006 |
| KR | 100757309 | 9/2007 |

\* cited by examiner

*Primary Examiner* — Zeev V Kitov
(74) *Attorney, Agent, or Firm* — Cantor Colburn LLP

(57) ABSTRACT

An electrical device protection circuit for a smart grid includes a detection unit for detecting whether or not the output power source of an electrical device short-circuits; a switch unit for connecting power, input to the electrical device, to the output power source of the electrical device or disconnect it therefrom; and a control unit for generating a control signal for making the switch unit disconnect the power input to the electrical device from the output power source of the electrical device. According to the electrical device protection circuit for a smart grid, a simply configured protection circuit, arranged in the electrical device, operates when the output power source of the electrical device short-circuits, whereby the electrical device may be prevented from being damaged.

4 Claims, 3 Drawing Sheets

ELECTRICAL DEVICE PROTECTION CIRCUIT FOR SMART GRID

BACKGROUND OF THE INVENTION

1. Field of the Invention

The present invention relates generally to an electrical device protection circuit for a smart grid. More particularly, the present invention relates to an electrical device protection circuit for a smart grid, which is included in an electrical device and may prevent the electrical device, such as a socket, from being damaged when an AC power source short-circuits.

2. Description of the Prior Art

Korean Patent No. 20-0421608, titled "Socket-type ballast circuit for fluorescent lamp", discloses a ballast stabilizer configured such that a switch is arranged in a ballast circuit in order to connect/disconnect power therein when inspecting or replacing a fluorescent lamp or is the stabilizer, thus improving stability when the inspection or replacement is performed. According to Korean Patent No. 20-0421608, if abnormal current or overcurrent flows while power is supplied from a power source to the ballast circuit, an overcurrent protection device electrically disconnects the ballast circuit so as to prevent the further supply of power, so that not only the ballast circuit but also the fluorescent lamp is protected.

Generally, a socket has a current rating of 16A, and when a short circuit occurs at the output of a socket, if a circuit breaker of a distribution panel is slow to respond thereto, the socket may be damaged. Therefore, when a short circuit occurs at the output of the socket, it is necessary to quickly detect it and shut off the supply of power via the socket. Also, because a socket needs a protection circuit installed therein in order to detect a short circuit and shut off the supply of power via the socket, it is essential to configure the protection circuit so as to be simple. Therefore, it is difficult to apply the device proposed in Korean Patent 20-0421608 without change.

SUMMARY OF THE INVENTION

Accordingly, the present invention has been made keeping in mind the above problems occurring in the related art, and an object of the present invention is to provide an electrical device protection circuit for a smart grid, which is arranged in an electrical device and has a simple configuration in order to prevent the electrical device from being damaged when the output power source of the electrical device short-circuits.

A protection circuit for an electrical device according to the present invention includes a detection unit for detecting whether or not an output power source of the electrical device short-circuits; and a switch unit for connecting power, input to the electrical device, to the output power source of the electrical device or disconnecting the power therefrom, wherein when the detection unit detects a short circuit of the output power source of the electrical device, the switch unit disconnects the power, input to the electrical device, from the output power source of the electrical device.

Desirably, the detection unit includes a comparator for comparing a neutral signal of the output power source of the electrical device with a neutral signal of a power signal input to the electrical device and for outputting a comparison result; a rectifier for rectifying the neutral signal of the output power source of the electrical device; and a voltage distributor for stepping down a voltage level of an output of the rectifier and inputting the output to one end of the comparator.

Additionally, the protection circuit is configured such that the switch unit disconnects the power, input to the electrical device, from the output power source of the electrical device longer than a duration of a short circuit between a line signal of the output power source of the electrical device and a neutral signal of the output power source of the electrical device.

Also, the protection circuit is configured such that the switch unit delays connection of the power, input to the electrical device, to the output power source of the electrical device for a preset time after the line signal of the output power source of the electrical device and the neutral signal of the output power source of the electrical device are converted from a short circuit state into an open state.

According to the electrical device protection circuit for a smart grid, a protection circuit, having a simple configuration and arranged in the electrical device, operates when the output power source of the electrical device short-circuits, whereby the electrical device may be prevented from being damaged.

BRIEF DESCRIPTION OF THE DRAWINGS

The above and other objects, features and other advantages of the present invention will be more clearly understood from the following detailed description when taken in to conjunction with the accompanying drawings, in which.

DETAILED DESCRIPTION OF THE EXEMPLARY EMBODIMENTS

Hereinafter, an electrical device protection circuit for a smart grid according to an embodiment of the present invention will be described in detail with reference to the accompanying drawings.

It is apparent that the following embodiment is merely intended to embody the present invention and is not intended to limit or restrict the scope of the present invention. Details that can be easily inferred by those skilled in the art to which the present invention pertains, from the detailed description and the embodiment of the present invention, should be interpreted as being included in the spirit and scope of the present invention.

Figure 1:
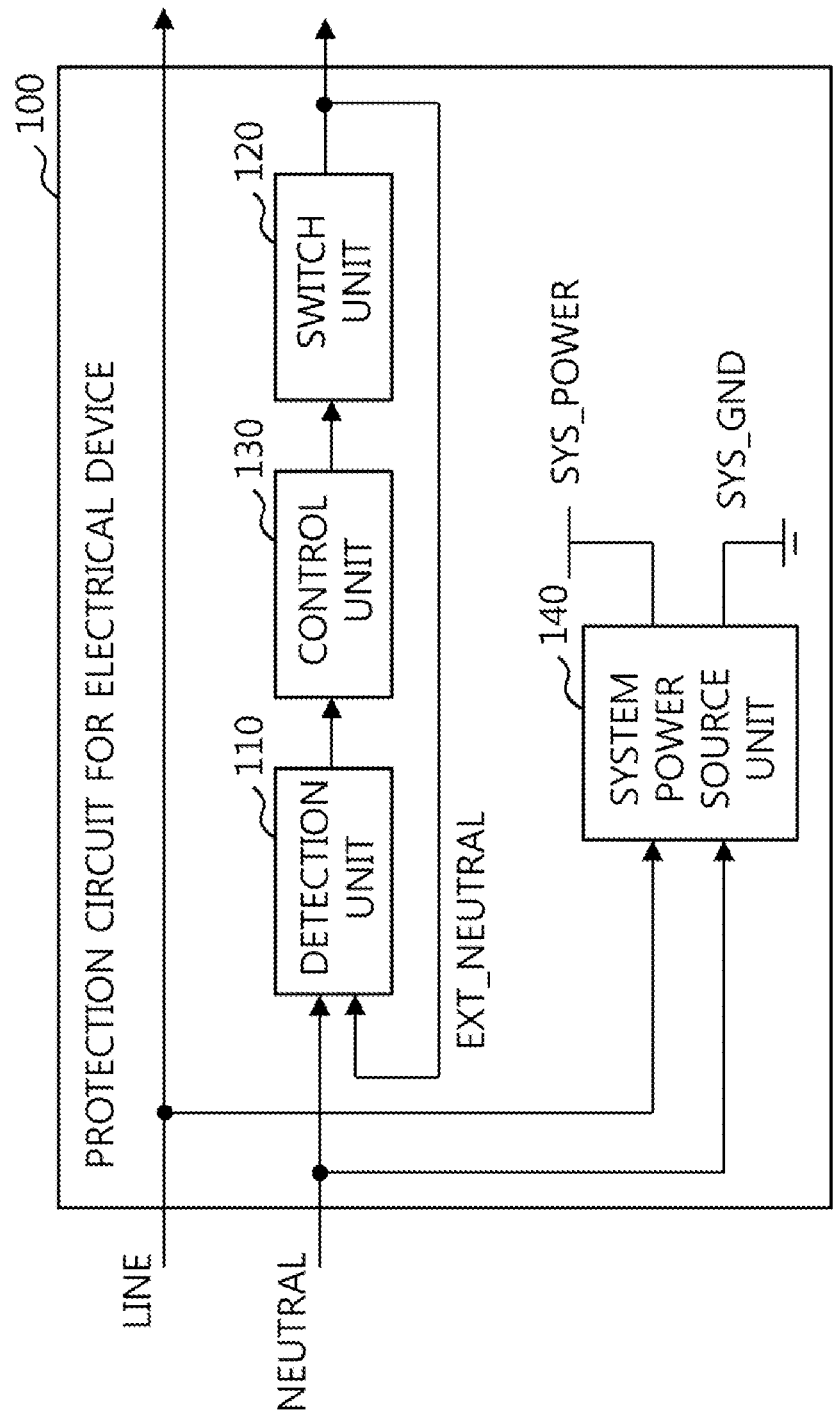
FIG. 1 is a block diagram of an electrical device protection circuit for a smart grid according to a preferred embodiment of the present invention.

FIG. 1 illustrates a block diagram of an electrical device protection circuit 100 for a smart grid according to a preferred embodiment of the present invention.

As shown in FIG. 1, the electrical device protection circuit 100 for a smart grid according to a preferred embodiment of the present invention includes a detection unit 110, a switch unit 120, a control unit 130, and a system power source unit 140.

As an example of an electrical device for a smart grid, there are home appliances and various devices for connecting a power source, such as an electric socket.

The detection unit 110 serves to detect whether or not the output power source of the electrical device short-circuits. The switch unit 120 connects power, input to the electrical device, to the output power source of the electrical device or disconnects it therefrom. Specifically, because a line signal LINE of the power, input to the electrical device, is connected to a line signal LINE of the output power source of the electrical device, the line signal LINE of the power, input to the electrical device, is the same as the line signal LINE of the output power source of the electrical device. Meanwhile, a neutral signal EXT_NEUTRAL of the power output from the electrical device is connected to the neutral signal NEUTRAL of is the input power source of the electrical device via the switch unit 120.

When the detection unit 110 detects the the output power source of the electrical device is short-circuiting, the control unit 130 generates a control signal CONT to make the switch unit 120 disconnect the power, input to the electrical device, from the output power source of the electrical device. In other words, on/off operation of the switch unit 120 is controlled by the control signal CONT, which is generated by the control unit 130.

The system power source unit 140 receives AC power, converts it into DC power, and supplies the converted power to the circuits in the electrical device.

Figure 2:
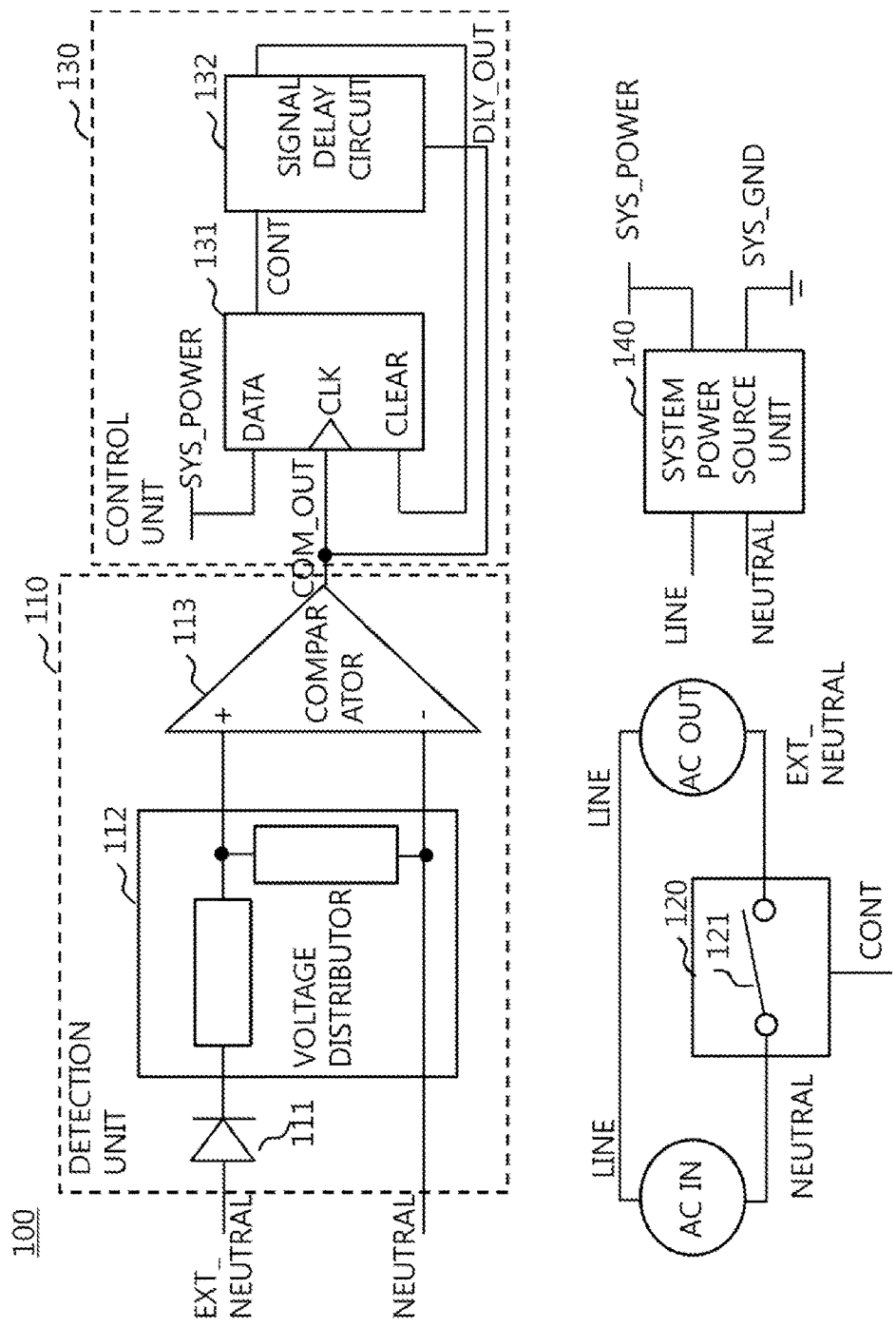
FIG. 2 is a detailed circuit diagram of the electrical device protection circuit for a smart grid according to a preferred embodiment of the present invention, illustrated in FIG. 1.

FIG. 2 illustrates a detailed circuit diagram of the electrical device protection circuit 100 for a smart grid according to a preferred embodiment of the present invention, illustrated in FIG. 1.

Hereinafter, a method for implementing the electrical device protection circuit 100 for a smart grid according to a preferred embodiment of the present invention will be described in detail with reference to FIG. 2.

The detection unit 110 includes a rectifier 111, a voltage distributor 112, and a comparator 113.

The rectifier 111 may perform half-wave rectification or full-wave rectification of the input power. In FIG. 2, a half-wave rectifier using a diode is illustrated. Specifically, the rectifier 111 serves to rectify the neutral signal EXT_NEUTRAL of the output power source of the electrical device. However, in the event of a short circuit between the terminal of the line signal LINE of the output power source of the electrical device and the terminal of the neutral signal EXT_NEUTRAL of the output power source of the electrical device, the line signal LINE of the output power source of the electrical device is input to the rectifier 111. Here, to because the line signal LINE is an AC signal in the form of a sine wave, rectification thereof is required. For reference, an AC power signal is implemented as two signals, namely, a neutral signal and a line signal, of which the line signal may be called a hotline signal.

The output voltage of the rectifier 111 has a signal that is too large to be input to the comparator 113. Therefore, it is necessary to step down the voltage level of the output of the is rectifier 111 using the voltage distributor 112 and to input it to one end of the comparator 113.

Additionally, the comparator 113 serves to compare the neutral signal EXT_NEUTRAL of the output power source of the electrical device with the neutral signal NEUTRAL of the power input to the electrical device and to output the result of comparison. Here, the neutral signal EXT_NEUTRAL of the output power source of the electrical device, to be input to the comparator 113, is a signal of which the voltage level has been regulated using the rectifier 111 and the voltage distributor 112.

For example, when a short circuit occurs between the line signal LINE of the output power source of the electrical device and the neutral signal EXT_NEUTRAL of the output power source of the electrical device, even if the neutral signal EXT_NEUTRAL of the output power source of the electrical device is input to the rectifier 111, the signal level thereof is the same as that of the line signal LINE of the output power source of the electrical device due to the short circuit. Therefore, the levels of the two signals input to the comparator 113 differ from each other, and thus the output COM_OUT of the comparator 113 becomes 'HIGH'.

The control unit 130 of the present invention generates a control signal for making the switch unit 120 keep the power, input to the electrical device, disconnected from the output power source of the electrical device longer than the duration of a short circuit between the line signal LINE of the output power source of the electrical device and the neutral signal EXT_NEUTRAL of the output power source of the electrical device. Specifically, the switch unit 120 includes a switch 121 of which the on/off operation is controlled between the neutral signal NEUTRAL of the power, input to the electrical device, and the neutral signal EXT_NEUTRAL of the output power source of the electrical device.

Specifically, the control unit 130 generates a control signal that makes the switch unit 120 delay the connection of power, input to the electrical device, to the output power source of the electrical device for a preset time after the line signal LINE of the output power source of the electrical device and the neutral signal EXT_NEUTRAL of the output power source of the electrical device are converted from a short circuit state into an open state.

Figure 3:
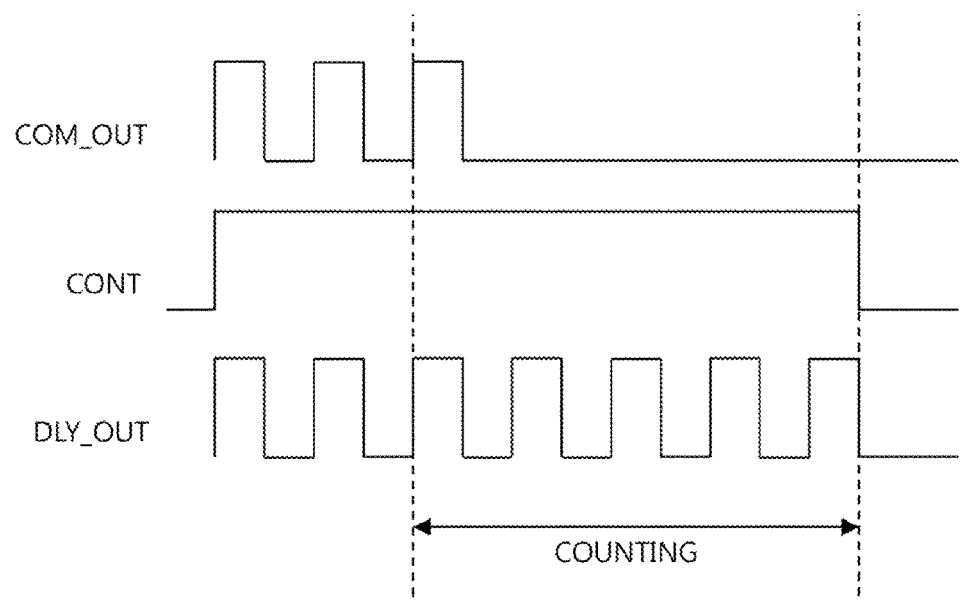
FIG. 3 is a timing chart of a signal output from a comparator and a signal generated by a control unit.

FIG. 3 is a timing chart of an output signal COM_OUT of a comparator 113 and a is signal generated by a control unit 130.

Specifically, the control unit 130 includes a flip-flop circuit 131 and a signal delay circuit 132.

The flip-flop circuit 131 initiates the disconnection of the switch unit 120, and the signal delay circuit 132 keeps the switch unit 120 disconnected for a preset time after the line signal LINE of the output power source of the electrical device and the neutral signal EXT_NEUTRAL of the output power source of the electrical device are converted from a short circuit state into an open state. Here, the output signal CONT of the flip-flop circuit 131 is input to the switch unit 120 as the control signal of the switch unit 120.

When the output signal COM_OUT of the comparator 113 becomes 'HIGH', the output signal CONT of the flip-flop circuit 131 changes. The output signal CONT of the flip-flop circuit 131 is maintained for a preset time by the signal delay circuit 132 using a counter, and then is changed to 'CLEAR'. When the output signal CONT of the flip-flop circuit 131 becomes 'CLEAR', the switch 121 of the switch unit 120 is turned on.

Specifically, when the output signal COM_OUT of the comparator 113 becomes 'HIGH' for the first time, the switch unit 120 is turned off by the output signal CONT of the flip flop circuit 131, and the signal delay circuit 132 starts counting by a 'CLEAR' signal input thereto. Then, when the output signal COM_OUT of the comparator 113 becomes 'HIGH' for the second time, the 'CLEAR' signal is input to the signal delay circuit 132, so that the signal delay circuit 132 restarts counting. Subsequently, when the output signal COM_OUT of the comparator 113 becomes 'HIGH' for the last time, the 'CLEAR' signal is input to the signal delay circuit 132, so that the signal delay circuit 132 restarts counting. After that, when the signal delay circuit 132 finishes counting, the output signal CONT of the flip-flop circuit 131 to becomes 'CLEAR'. That is, when the signal delay circuit 132 finishes counting, the output CONT of the flip-flop circuit 131 becomes 'LOW'. In other words, before the signal delay circuit 132 finishes counting, the output signal CONT of the flip-flop circuit 131 remains 'HIGH'.

That the output signal COM_OUT of the comparator 113 is finally changed from is 'HIGH' to 'LOW' indicates that the line signal LINE of the output power source of the electrical device and the neutral signal EXT_NEUTRAL of the output power source of the electrical device are changed from a short circuit state into an open state.

As described above, according to the electrical device protection circuit 100 for a smart grid, a protection circuit, having a simple configuration and arranged in the electrical device, operates when the output power source of the electrical device short-circuits, whereby the electrical device may be prevented from being damaged.

What is claimed is:

1. A protection circuit for an electrical device, comprising:
   a detection unit for detecting whether or not an output power source of the electrical device short-circuits, wherein the detection unit comprises a comparator for comparing a neutral signal of the output power source of the electrical device with a neutral signal of a power signal input to the electrical device and for outputting a comparison result; and
   a switch unit for connecting power, input to the electrical device, to the output power source of the electrical device or disconnecting the power therefrom, wherein when the detection unit detects a short circuit of the output power source of the electrical device, the switch unit disconnects the power, input to the electrical device, from the output power source of the electrical device.

2. The protection circuit of claim 1, wherein the detection unit further comprises:
   a rectifier for rectifying the neutral signal of the output power source of the electrical device; and
   a voltage distributor for stepping down a voltage level of an output of the rectifier and inputting the output to one end of the comparator.

3. The protection circuit of claim 1, wherein the protection circuit is configured such that the switch unit disconnects the power, input to the electrical device, from the output power source of the electrical device longer than a duration of a short circuit between a line signal of the output power source of the electrical device and the neutral signal of the output power source of the electrical device.

4. The protection circuit of claim 3, wherein the protection circuit is configured such that the switch unit delays connection of the power, input to the electrical device, to the output power source of the electrical device for a preset time after the line signal of the output power source of the electrical device and the neutral signal of the output power source of the electrical device are converted from a short circuit state into an open state.

* * * * *